United States Patent [19]

Walkow

[11] 4,335,602
[45] Jun. 22, 1982

[54] METHOD AND APPARATUS FOR PROTECTING SUBSURFACE ELECTRONIC ASSEMBLIES FROM SHOCK AND VIBRATION DAMAGE

[75] Inventor: Arnold M. Walkow, Houston, Tex.

[73] Assignee: Dresser Industries, Inc., Dallas, Tex.

[21] Appl. No.: 161,826

[22] Filed: Jun. 23, 1980

[51] Int. Cl.³ ............................................. E21B 47/00
[52] U.S. Cl. ........................................................ 73/152
[58] Field of Search ..................... 73/152, 432 A, 151; 308/233, 6 R, 6 A

[56] References Cited

U.S. PATENT DOCUMENTS

| | | | |
|---|---|---|---|
| 1,357,562 | 11/1920 | Hope | 308/233 |
| 1,993,809 | 3/1935 | Schnelle | 308/233 |
| 2,627,759 | 2/1953 | Fincher | 308/6 R X |
| 3,339,462 | 9/1967 | Bankowski | 308/6 R X |
| 3,995,479 | 12/1976 | Chapman | 73/151 |

Primary Examiner—Jerry W. Myracle
Attorney, Agent, or Firm—Richard M. Byron; Patrick H. McCollum

[57] ABSTRACT

Electronics circuitry for obtaining measurements of subsurface formation parameters is mounted on an elongated chassis which is removably disposed within a tubular housing. One or more sets of angularly disposed ball rollers are disposed along the length of the chassis. At least one of the ball rollers comprising each set will be of the plunger type, capable of exerting a high force level due to the preloaded compression of a plurality of disk springs. The ball rollers are angularly disposed and operatively set so as to exert restraining force upon the chassis while allowing simple insertion into the housing.

5 Claims, 4 Drawing Figures

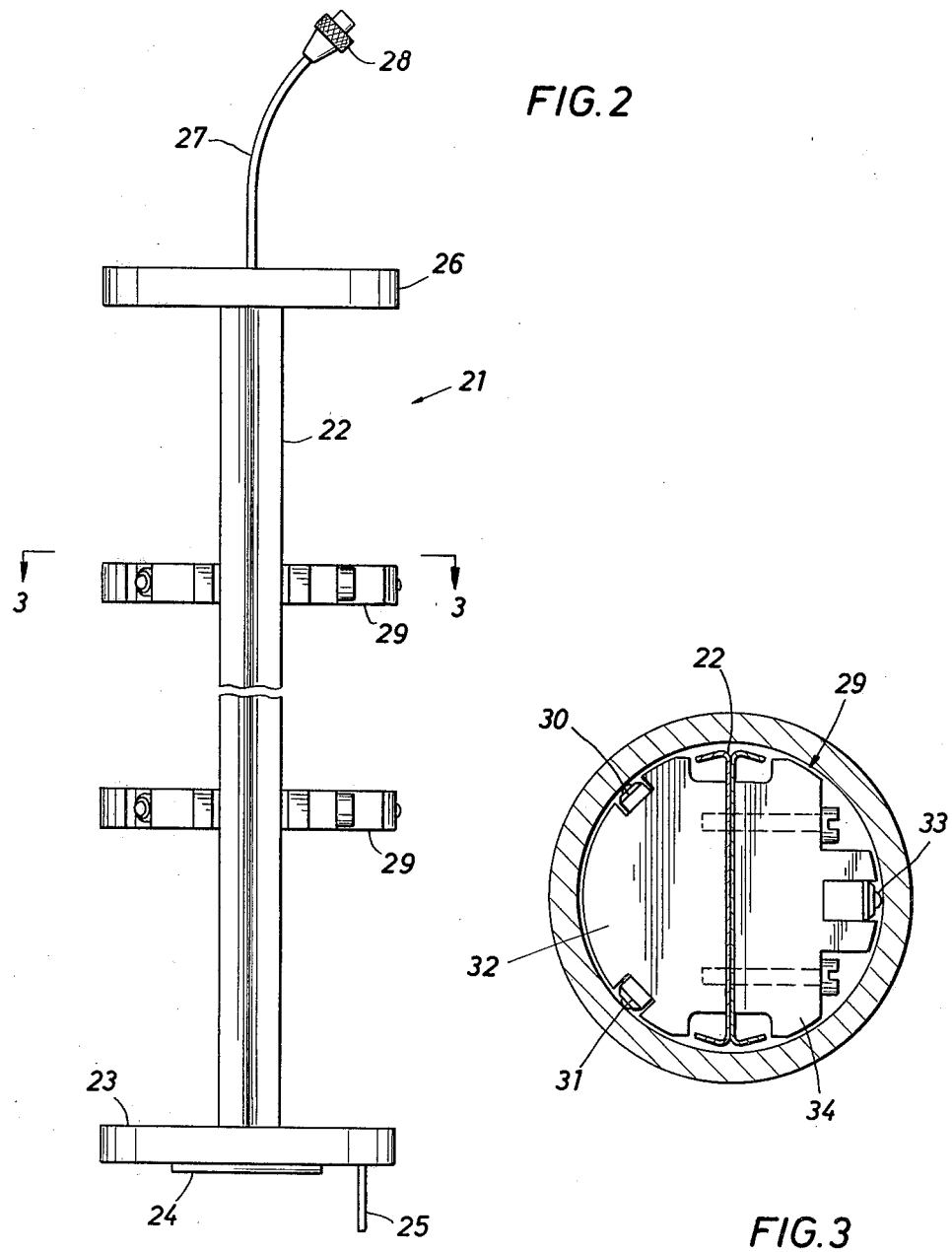

METHOD AND APPARATUS FOR PROTECTING SUBSURFACE ELECTRONIC ASSEMBLIES FROM SHOCK AND VIBRATION DAMAGE

BACKGROUND OF THE INVENTION

This invention relates to improved well logging methods and apparatus, and more particularly relates to novel methods and apparatus for reducing damage to downhole electronic instrument assemblies caused by vibration and physical abuse.

It is well known that oil and gas are found in subsurface earth formations, and that wells are drilled into these formations to recover such substances. However, it is usually necessary to survey or log the length of the borehole to ascertain if any of the formations contain significant recoverable amounts of oil and gas to justify completing the well.

There is no single well logging technique or device which can provide a direct indication and evaluation of oil or gas in a particular formation of interest. Instead a variety of logging techniques have been devised, which measure various different physical parameters of the earth substances adjacent the borehole. Since no one earth parameter can of itself provide a definitive and conclusive indication of the presence of oil and gas in commercial quantities, there has been a continuing need to perform as many different types of logging measurements as possible.

The various subsurface measuring systems require a considerable amount of downhole electronics circuitry for obtaining the desired subsurface parameter. The severe space restrictions and the rigorous borehole environmental conditions require that the downhole electronics circuitry be sealingly enclosed within a tubular housing of small diameter. To comply with assembly, repair and maintenance requirements of the downhole electronics, typically the electronics circuit components are mounted along a length of narrow metal chassis member which is removably installed within an elongated tubular housing. The enclosure is sealed so as to protect the electronics assembly from exposure to pressure and fluids within the borehole.

In performing typical logging operation, an instrument is lowered, by means of a cable suspending the instrument within the well, to a point in the borehole. The instrument is then caused to traverse the borehole while measuring a selected parameter of the subsurface formation. During the traversal of the borehole, the downhole assembly must be able to withstand extreme shock and severe vibration which are imposed on the measuring device.

The severe environment in which these devices are required to operate presents a major problem when designing the subsurface electronics assembly. The requirement that the electronic components be mounted on a relatively long and slender chassis will leave the assembly susceptible to damage due to extreme shock and severe vibration unless the chassis is securely retained within the housing. Further, the chassis member must be securely retained within the housing by a retaining method which allows simple removal and installation of the chassis within the housing.

Accordingly, the present invention overcomes these difficulties by providing method and apparatus for protecting the subsurface electronics from damage due to shock and vibration while providing easy removal and reinsertion of the electronics assembly within the protective housing.

SUMMARY OF THE INVENTION

Apparatus for investigating earth formations according to the present invention includes mounting one or more sets of angularly disposed ball rollers along the length of an elongated electronic chassis member. At least one of the ball rollers comprising each set will be a disk spring, plunger type which is capable of exerting a high force level. The ball roller sets allow easy longitudinal insertion of the chassis into the tubular housing with the balls in rolling engagement with the inner circumference of the housing. By appropriate preloading of the disk spring to a preselected force level the plunger ball roller will cooperate with the remaining ball rollers to prevent undue movement of the chassis when the downhole device is subjected to shock and vibration.

Accordingly, it is a feature of the present invention to provide new and improved downhole electronics retention means for reducing damage due to vibration and shock.

Another feature of the present invention is to provide new and improved retaining means which allow simple assembly and disassembly of the subsurface device.

A further feature of the present invention is to provide new and improved ball plunger devices which utilize a plurality of disk springs for exerting high force levels and yet is contained in a small package configuration.

BRIEF DESCRIPTION OF THE DRAWINGS

FIG. 2 is a siew of an elongated electronics chassis utilizing the restraining means of the present invention.

FIG. 3 is a cut-away view of the present restraining means taken on the 3—3 line of FIG. 2.

DETAILED DESCRIPTION OF THE DRAWINGS

Figure 1:
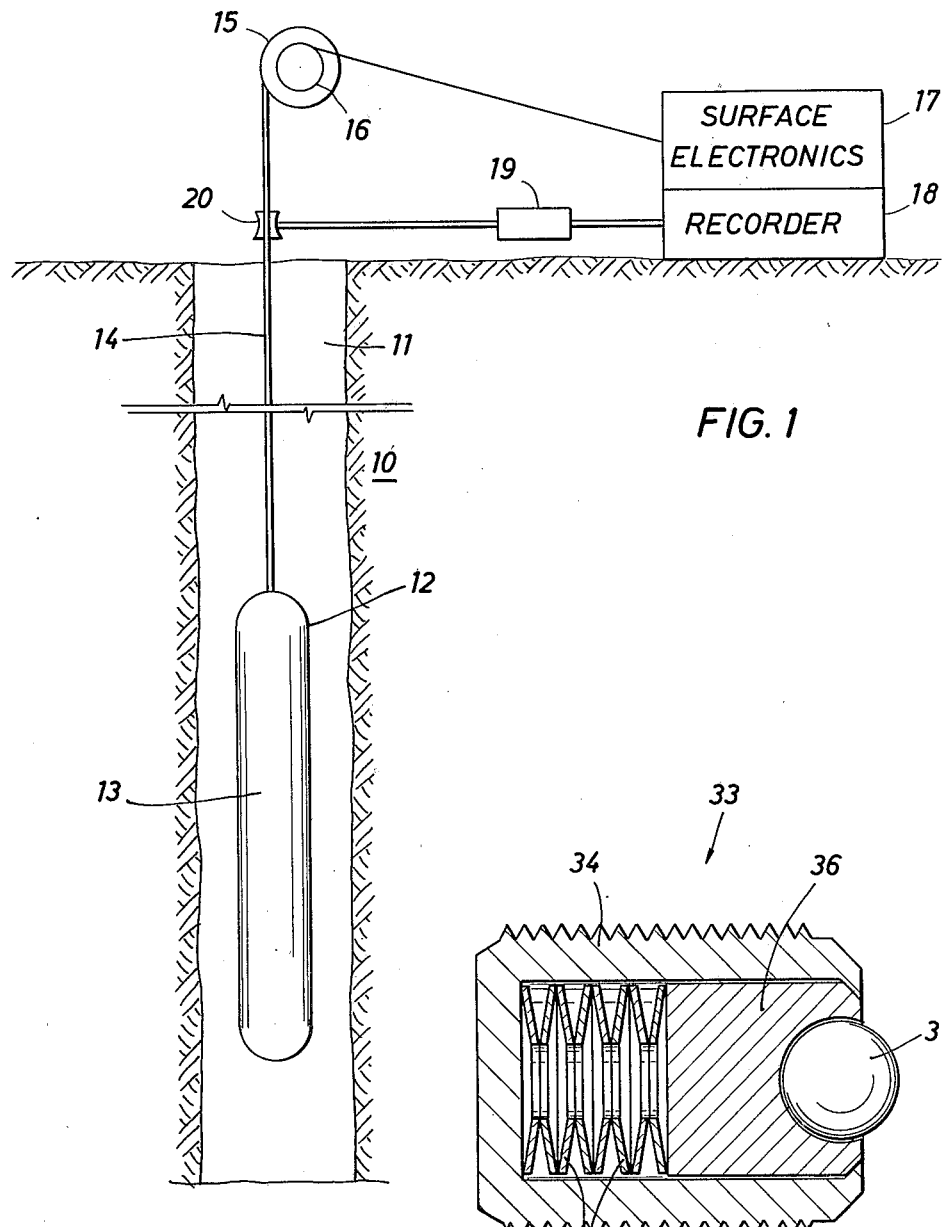
FIG. 1 is a pictorial view, partly in cross-section, of typical well logging instrument suspended in a borehole.

Referring now to the drawings in detail, particularly to FIG. 1, there is illustrated schematically a well surveying operation in which a portion of the earth's surface 10 is shown in vertical section. An earth borehole 11 penetrates the earth's surface and may or may not be cased. Disposed within the well is the subsurface instrument 12 of the well logging system. As is well known in the art, subsurface instrument 12 can be a resistivity, acoustic, radioactivity or any one of the other instruments used for measuring subsurface parameters.

Subsurface instrument 12 is partially comprised of an electronics section 13 which houses a chassis member upon which is mounted the electronics components required for the operation of instrument 12. Cable 14 suspends instrument 12 in the well and contains the required conductors for electronically connecting the instrument with the surface apparatus. Cable 14 is wound on or unwound from drum 15 in raising and lowering instrument 12 to traverse the well.

In making the well log, instrument 12 is caused to traverse the well. Thereby, a measurement of at least one formation parameter is obtained. The resultant signal is sent to the surface through conductors within cable 14. Through slip rings and brushes 16 on the end of drum 15, the signals are coupled into surface electronics 17. After processing by the circuitry therein the resulting information is recorded on recorder 18. Recorder 18 is driven through transmission 19 by a measuring reel 20 over which cable 14 is drawn so that recorder 18 moves in correlation with the depth as instrument 12 traverses the well. It should be understood that the housing for instrument 12 is constructed to withstand the pressures and mechanical and thermal abuses encountered in logging a well.

Referring now to FIG. 2, there is illustrated an elongated chassis member 21 on which the electronic components needed in subsurface electronics 13 are mounted. Chassis member 21 is comprised of an elongated body member 22 for mounting the electronic components thereon, and a lower plate assembly 23 upon which is affixed electric plug 24 and guide pin 25. Guide pin 25 is to assure the proper alignment of plug 24 when the instrument is inserted within the tubular housing and prevent rotation of chassis member 22 after installation. Plug 24 provides electrical connection from the electronics circuitry to the lower section of subsurface instrument 12. Additionally, lower plate 23, along with upper plate 26 provide support for the ends of chassis member 21 when installed within the housing. Electrical cable 27 and plug 28 provide the required electrical connections for getting power to and transferring signals from the electronic circuitry mounted along the length of chassis member 22.

Mounted at selected intervals along the length of chassis member 21 are one or more roller ball assemblies 29. Referring to FIG. 3 there is illustrated one such assembly. Each assembly 29 is comprised of two freely rotating roller balls 30 and 31, threadably mounted into a first shelf 32, and a plunger ball assembly 33 threadably mounted into plate 34. Roller ball assemblies 30 and 31 are angularly disposed at 90° from one-to-another, with plunger ball assembly 33 disposed at 135° from both roller ball assembly 30 and 31. Each roller ball assembly 30, 31, and 33 is threadably engaged into the respective shelf member for operative rolling engagement with the internal circumference of the housing as chassis member 21 is slidably installed into and removed from the housing.

Figure 4:
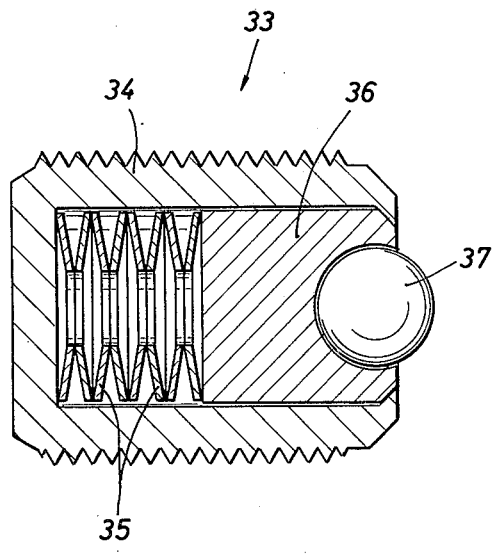
FIG. 4 is a closeup view of the disk spring ball plunger of the present invention.

Turning now to FIG. 4, there is shown, in cross-section, plunger assembly 33, which provides the force level required to restrain chassis member 21 in place to reduce vibration and shock damage to the electronic components mounted on elongated plate 22. Plunger assembly 33 has a body member 34 comprised of an internal cavity area and an external threaded portion for threadably mounting into plate member 34. Stacked within the internal chamber of body member 34 are a plurality of disk springs 35. Disk springs 35 are stacked within the cavity of body member 34 to provide an additive force level against plunger member 36. In the preferred embodiment there are nine disk springs each having a 0.250 inch outside diameter and a 0.125 inch inside diameter. Roller ball 37 is swage mounted into the externally exposed end portion of plunger member 36, so as to allow roller ball 37 to be freely rotatable. It is contemplated that the roller ball be of approximately 0.156 inches in diameter.

Plunger member 36 is swage mounted into body member 34. In the preferred embodiment, plunger member 36 is installed within body member 34 in such a manner that for a 0.01 depression movement of plunger member 36 there will be required a force of approximately 30 pounds to be exerted upon roller ball 37. This preloaded force is established during the swaging process and provides sufficient force to restrain chassis member 21 within the housing.

Many modifications and variations besides those specifically mentioned may be made in the techniques and structures described herein and depicted in the accompanying drawings without departing substantially from the concept of the present invention. Accordingly, it should be clearly understood that the forms of the invention described and illustrated herein are exemplary only, and are not intended as limitations on the scope of the present invention.

The embodiment of the invention in which an exclusive property or privilege is claimed are defined as follows:

1. Well logging apparatus for investigating earth formations traversed by a borehole, comprising:
an elongated tubular housing adapted to traverse said borehole;
an elongated instrument chassis having instrumentation circuitry mounted thereon and adapted for positioning within said tubular housing;
a pair of freely rotating ball rollers angularly disposed and mounted on said chassis; and
at least one spring loaded ball roller assembly said assembly comprised of a housing having an internal cavity therein, a plunger member slidably retained within said cavity and a plurality of disk springs disposed within said cavity for exerting an outward force upon said plunger, said plunger being compressed when said chassis is positioned within said housing for restraining said chassis within said housing.

2. The apparatus of claim 1 wherein said freely rotating ball rollers are angularly disposed by 90 degrees.

3. The apparatus of claim 2 wherein said spring loaded ball roller assembly is angularly disposed by 135 degrees from said pair of roller balls.

4. The apparatus of claim 3 wherein said spring loaded ball roller assembly is threadably mounted on said chassis to allow setting of the compressional movement of said plunger when said chassis is inserted within said housing.

5. The apparatus of claim 4 wherein said disk springs exert an outward force against said plunger of from between 30–36 pounds for a 0.01 inch inwardly movement of said plunger.

* * * * *